(12) United States Patent
Kamini et al.

(10) Patent No.: US 11,124,136 B2
(45) Date of Patent: Sep. 21, 2021

(54) CONTROLLING VEHICLE MODULES BASED ON MEDIA CONTENT

(71) Applicant: GM GLOBAL TECHNOLOGY OPERATIONS LLC, Detroit, MI (US)

(72) Inventors: Aditya S. Kamini, Bloomfield Hills, MI (US); Richard Elswick, Warren, MI (US); Nathaniel H. Williams, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 503 days.

(21) Appl. No.: 15/847,197

(22) Filed: Dec. 19, 2017

(65) Prior Publication Data
US 2019/0184919 A1    Jun. 20, 2019

(51) Int. Cl.
| | | |
|---|---|---|
| B60R 16/023 | (2006.01) | |
| G06F 3/01 | (2006.01) | |
| B60N 2/02 | (2006.01) | |
| A63F 13/25 | (2014.01) | |
| H04W 12/06 | (2021.01) | |
| H04W 12/08 | (2021.01) | |
| B60H 1/00 | (2006.01) | |
| B60N 2/56 | (2006.01) | |

(52) U.S. Cl.
CPC .......... *B60R 16/0237* (2013.01); *A63F 13/25* (2014.09); *B60H 1/00985* (2013.01); *B60N 2/0232* (2013.01); *B60N 2/0244* (2013.01); *B60N 2/56* (2013.01); *G06F 3/011* (2013.01); *H04W 12/06* (2013.01); *H04W 12/08* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 10,732,721 B1* | 8/2020 | Clements | G02B 30/56 |
| 2016/0180602 A1* | 6/2016 | Fuchs | A63F 13/73 463/31 |
| 2017/0003044 A1* | 1/2017 | Shah | F24F 11/62 |
| 2017/0323639 A1* | 11/2017 | Tzirkel-Hancock | H04M 1/6075 |
| 2018/0192446 A1* | 7/2018 | Skobov | H04W 76/15 |
| 2019/0011703 A1* | 1/2019 | Robaina | A61B 90/36 |
| 2019/0186770 A1* | 6/2019 | Saffre | F24F 11/62 |
| 2019/0188912 A1* | 6/2019 | Kamini | G05D 1/0088 |

\* cited by examiner

*Primary Examiner* — Thomas E Worden
(74) *Attorney, Agent, or Firm* — Lorenz & Kopf LLP (57) ABSTRACT

A system and method of providing an immersive media experience to a user through utilizing one or more vehicle system modules (VSMs) included in a vehicle, wherein the method includes: establishing a connection with a media control device, wherein the media control device includes a display; determining whether the media control device is authorized to control the one or more VSMs as a part of the immersive media experience; receiving an immersive media control request from the media control device, wherein the immersive media control request includes a request from the media control device to perform one or more vehicle functions using the VSMs during playback of immersive media content, and wherein the playback of the immersive media content includes visually perceptible media content that is displayed using the display of the media control device; and controlling the one or more VSMs according to the received VSM control requests.

13 Claims, 2 Drawing Sheets

CONTROLLING VEHICLE MODULES BASED ON MEDIA CONTENT

INTRODUCTION

The present invention relates to controlling vehicle modules based on media content presented at a media control device.

Vehicles include hardware and software capable of various multimedia functions, including playing audio received from radio stations, mobile devices (e.g., smartphones, tablets), many of which utilize wireless communications, such as short-range wireless communications (SRWC). Additionally, vehicles include numerous vehicle system modules (VSMs) that can be used to provide heat or air conditioning to the vehicle interior environment, as well as various motorized modules that can be automatically operated or controlled by the vehicle, such as seat position motors that control the position and angle of passenger and driver seats. Other VSMs exist, such as those utilizing haptic motors that can provide a haptic or tactile feedback to a driver or passenger, as well as many others.

SUMMARY

According to one aspect of the invention, there is provided a method of providing an immersive media experience to a user through utilizing one or more vehicle system modules (VSMs) included in a vehicle, wherein the method includes: establishing a connection with a media control device, wherein the media control device includes a display; determining whether the media control device is authorized to control the one or more VSMs as a part of the immersive media experience; receiving an immersive media control request from the media control device, wherein the immersive media control request includes a request from the media control device to perform one or more vehicle functions using the one or more VSMs during playback of immersive media content, and wherein the playback of the immersive media content includes visually perceptible media content that is displayed using the display of the media control device; and controlling the one or more VSMs according to the received VSM control requests.

According to various embodiments, this method may further include any one of the following features or any technically-feasible combination of these features:
- the media control device is a pair of wearable electronic augmented reality/virtual reality (AR/VR) goggles configured for visually presenting augmented reality or virtual reality media content to a user;
- the media control device is a personal mobile handheld device;
- the connection is established using short-range wireless communications (SRWC), wherein the SRWC include Bluetooth™, Wi-Fi™, or other IEEE 802.11 technology;
- the step of receiving credentials from the media control device, wherein the credentials are received after establishing the connection, and wherein the determining step includes comparing the received credentials with stored credential information;
- the steps of: obtaining permission request information, wherein the permission request information identifies at least one of the VSMs or a class of VSMs that the media control device requests to utilize during the immersive media experience; and determining whether to allow utilization of the one or more VSMs or VSMs included in the class of VSMs during the immersive media experience;
- the permission information is obtained as a part of the immersive media control request, and wherein the immersive media control request is received before beginning the immersive media experience;
- the permission information is obtained before beginning the immersive media experience, and wherein the immersive media control request is received after the beginning the immersive media experience;
- performance of the one or more vehicle functions includes using the one or more VSMs to communicate with the user by creating an environment that is perceivable by the user using non-audiovisual effects.
- at least one of the vehicle functions involves altering a temperature within the interior of the vehicle;
- the temperature within the interior of the vehicle that is altered is ambient air temperature within a cabin of the vehicle or a temperature of a seat within the vehicle; and/or
- at least one of the vehicle functions involves actuating motors coupled to a seat within the vehicle.

According to another aspect of the invention, there is provided a method of providing an immersive media experience to a user through utilizing one or more vehicle system modules (VSMs) included in a vehicle, wherein the method includes: establishing a connection with a media control device, wherein the media control device is a pair of augmented reality/virtual reality (AR/VR) goggles that are configured to fit around a head of the user such that a display of the pair of AR/VR goggles is within a field of view of the user; determining whether the media control device is authorized to control the one or more VSMs as a part of the immersive media experience; obtaining authorized permission information that indicates one or more permissions of the user or the media control device to control the one or more VSMs of the vehicle during the immersive media experience; receiving an immersive media control request from the media control device, wherein the immersive media control request includes a request from the media control device to perform one or more vehicle functions using one or more vehicle system modules (VSMs) during playback of immersive media content, wherein the playback of the immersive media content includes visually perceptible media content that is displayed using the media control device; determining whether the user or the media control device is permitted to control the one or more VSMs of the vehicle during the immersive media experience based on the authorized permission information; and when it is determined that the user or the media control device is permitted to control the one or more VSMs of the vehicle during the immersive media experience, operating the one or more VSMs according to the received VSM control requests.

According to various embodiments, this method may further include any one of the following features or any technically-feasible combination of these features:
- the step of receiving a driver override request, wherein the driver override request includes ceasing operating the one or more VSMs as a part of the immersive media experience;
- the step of receiving immersive media experience preferences at the vehicle via one or more vehicle-user interfaces, and wherein the determination of whether the user or the media control device is permitted to control the one or more VSMs is based on the immersive media experience preferences; and/or the steps of after receiving the immersive media control request, sending a control message to a body control module (BCM) included in the vehicle, wherein the message indicates the one or more vehicle functions; and after receiving the control message at the BCM, operating the one or more VSMs through sending a signal from the BCM to the one or more VSMs.

According to yet another aspect of the invention, there is provided a vehicular immersive media experience system that is included in vehicle electronics of a vehicle, including: a plurality of non-audiovisual vehicle system modules (VSMs), each of which is configured with a primary purpose other than presenting audio or visual information to a user; a body control module (BCM) that is communicatively coupled to the plurality of non-audiovisual VSMs; and a wireless communication device that includes a processor and non-transitory computer-readable memory, wherein a computer program is at least partly included in the non-transitory computer-readable memory, and wherein the computer program, when executed, causes the vehicle electronics to: establish a connection with a media control device, wherein the media control device includes a display; determine whether the media control device is authorized to control the plurality of VSMs as a part of the immersive media experience; receive an immersive media control request from the media control device, wherein the immersive media control request includes a request from the media control device to perform one or more vehicle functions using at least one of the plurality of vehicle system modules (VSMs) during playback of immersive media content, wherein the playback of the immersive media content includes visually perceptible media content that is displayed using the media control device; and control the at least one VSM according to the received VSM control requests such that at least one of the one or more vehicle functions are carried out, wherein the carrying out of the at least one vehicle functions includes using the at least one VSM to communicate with the user in a way other than using audio or visual effects.

According to various embodiments, this system may further include any one of the following features or any technically-feasible combination of these features:
- the computer program, when executed, further causes the vehicle electronics to: obtain permission request information, wherein the permission request information identifies the at least one VSM or a class of VSMs that the media control device requests to utilize during the immersive media experience; and determine whether to allow utilization of the at least one VSM or VSMs included in the class of VSMs during the immersive media experience;
- the computer program, when executed, further causes the vehicle electronics to: after receiving the immersive media control request, send a control message from the wireless communications device to the body control module BCM included in the vehicle, wherein the message indicates the at least one vehicle function; and after receiving the control message at the BCM, operate the at least one VSM through sending a signal from the BCM to the at least one VSM; and/or
- the media control device is a pair of wearable electronic AR/VR goggles configured for visually presenting augmented reality or virtual reality media content to a user.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables a media control device to control various vehicle system modules (VSMs) during playback of media content to create an immersive media experience for a user. The media control device, which can be augmented reality (AR) or virtual reality (VR) visual perception devices, can play media content (e.g., a video or video game), as well as send immersive media control requests to the vehicle. The immersive media control requests can include a request to have one or more VSMs perform a particular function or operation and, in many embodiments, the requested function or operation can correspond to the media content that is played back on the media control device. For example, the media content (which can be audiovisual (AV) content) can present a wintery scene and the immersive media control request can include a request to operate an air conditioning system within the vehicle so that the user perceiving the AV content can also perceive the cold air from the air conditioning system.

In one embodiment, the media control device is a pair of AR or VR goggles that are configured to fit around a user's head and that includes a display that, when the goggles are properly worn, is positioned in front of the user's eyes or field of vision. The media control device can include various media content, including AV media content that can be played to the user using the display and/or speakers included on or controlled by the goggles. The goggles (or media control device) can establish a connection, such as a short-range wireless communication (SRWC) connection, with the vehicle and, thereafter, can send immersive media control requests to the vehicle. These requests can be generated to correspond to an immersive VSM control interface, such as an application programming interface (API) that is defined by a vehicle OEM or third party. The immersive VSM control API can be made available to media content creators, such as those that develop AR/VR video games and/or media applications, such that immersive media control requests can be generated for particular portions or events included within the media content.

In some embodiments, the media control device (e.g., AR/VR goggles) can be authorized to control various VSMs of the vehicle during an immersive media experience presentation. For example, after a SRWC connection is established between the media control device and the vehicle, the vehicle can determine whether and/or to what extent the media control device is authorized to access and/or control various VSMs of the vehicle. In at least one embodiment, the media control device can include permission request information in an initial immersive media control request that includes requests for permission to control various VSMs of the vehicle. The vehicle can then inspect the permission request data and, based thereon as well as based on stored or obtained permission authorization information, can determine which VSMs the media control device may be permitted to control. And, in some embodiments, the permissions may change throughout the immersive media experience presentation due to changes in vehicle state, as will be detailed more below.

As explained in detail below, the vehicle immersive media experience system can leverage vehicle functionality of various VSMs to communicate sensory perceptions to a user to supplement AV content being perceived using the media control device. The vehicle immersive media experience system can include certain vehicle electronics, such as a plurality of VSMs, a body control module (BCM) that is configured to control the plurality of VSMs, and a wireless communications device configured to communicate with the media control device. The vehicle immersive media experience system can be used to operate VSMs in a way that differs from their primary purpose. For example, at least in some embodiments, vehicles include temperature control modules (e.g., heating/ventilation/air conditioning (HVAC) systems) that are primarily included to create a comfortable temperature within the vehicle interior. However, a user participating in an immersive media experience may desire to forgo comfort for a more immersive experience and, thus, this can be achieved by harnessing the functionality of various VSMs, such as the HVAC system. Additionally, in many embodiments, the carrying out of the at least one vehicle functions includes using VSMs to communicate with the user in a way other than using audio or visual effects, such as through tactile or haptic sensory outputs.

Figure 1:
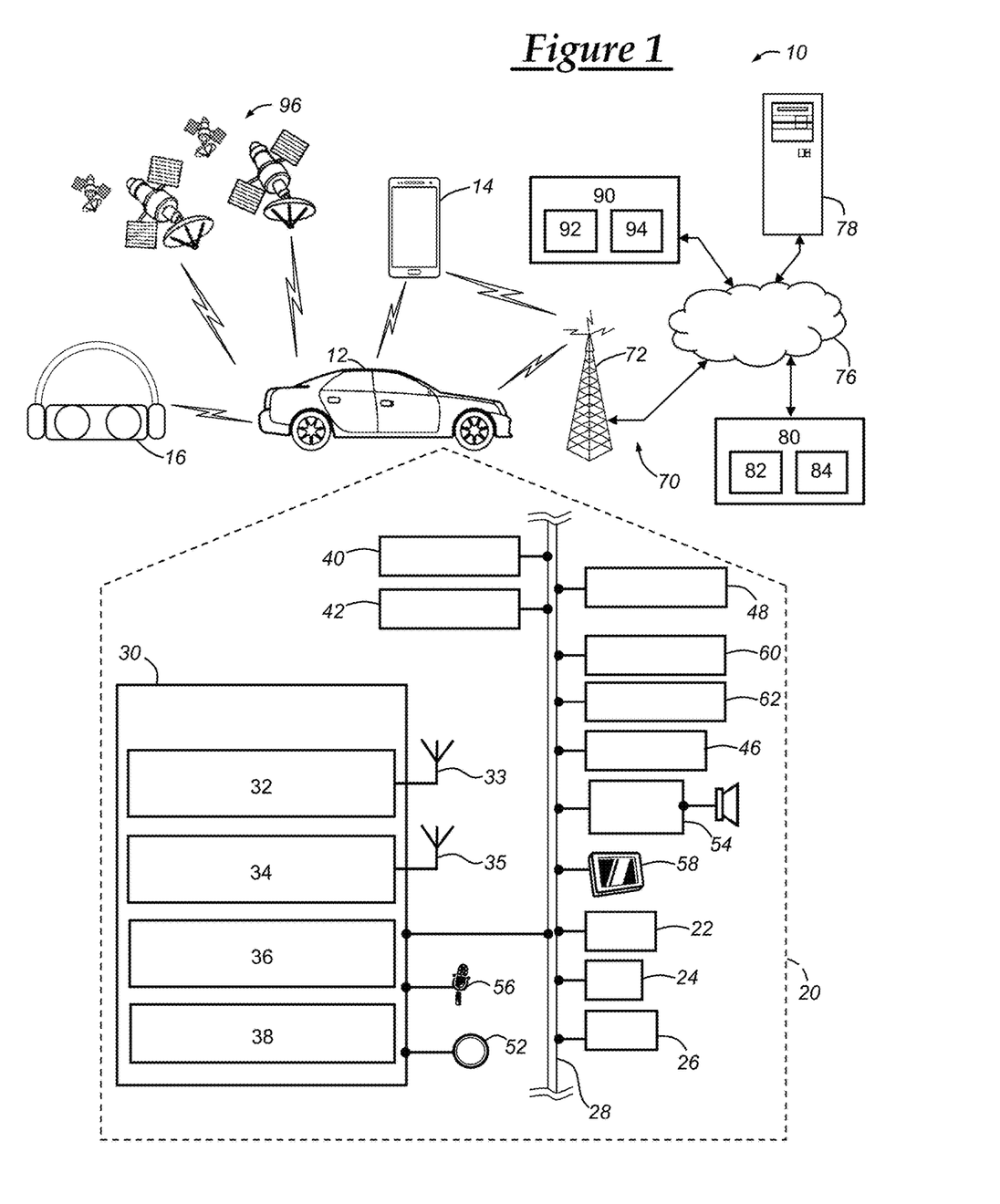
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with a wireless communications device 30 and VSMs 22-62, a media control devices 14 and 16, a constellation of global navigation satellite system (GNSS) satellites 96, one or more wireless carrier systems 70, a land communications network 76, a computer or server 78, a vehicle backend services facility 80, and a media content server 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a third party media content provider server (similar to media content server 90). Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to vehicle 12. In one embodiment, computers 78 can be used to carry out the method discussed herein; in other embodiments, the method can be carried out by servers or other computing devices at remote facility 80, as discussed more below; and, it yet another embodiment, the method can be carried out by a combination of computers 78 and servers at remote facility 80.

Remote facility 80 may be designed to provide the vehicle electronics 20 and/or media control devices 14,16 with a number of different system back-end functions through use of one or more electronic servers and, in many cases, may be a vehicle backend services facility that provides vehicle-related backend functionality. The remote facility 80 includes servers (vehicle backend services servers) 82 and databases 84, which may be stored on a plurality of memory devices. Also, remote facility 80 can include one or more switches, live advisors, an automated voice response system (VRS), all of which are known in the art. Remote facility 80 may include any or all of these various components and, preferably, each of the various components are coupled to one another via a wired or wireless local area network.

Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware programs stored in the memory (e.g., EEPROM, RAM, ROM), which enable the servers 82 to provide a wide variety of services. For instance, the at least one processor can execute programs or process data to carry out at least a part of the method discussed herein. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70. In one embodiment, servers 82 include an application that carries out at least some of the method illustrated below in FIG. 2.

Databases 84 can be stored on a plurality of memory, such as RAM, other temporary powered memory, any non-transitory computer-readable medium (e.g., EEPROM), or any other electronic computer medium that stores some or all of the software needed to carry out the various external device functions discussed herein. One or more databases at the remote facility can store account information such as vehicle services subscriber authentication information, vehicle identifiers, profile records, behavioral patterns, and other pertinent subscriber information. Also, a vehicle information database can be included that stores information pertaining to one or more vehicles.

Media content facility 90 (only one shown) can include a plurality of media content servers and/or media content databases. This facility 90 can hold media content, as well as media content subscription information pertaining to a user's access to the media content. The remote facility 90 can include similar hardware such as that which is described above with respect to remote facility 80. For example, servers 92 can include hardware and/or can be configured in a manner similar to that of servers 82, although the respective servers may provide different functionality. And, similarly, databases 94 can include similar hardware and/or can be configured in a manner similar to that of databases 84, although the organization or schema as well as the content of the databases may vary.

In one embodiment, media content facility 90 can include numerous servers 92 that are configured to receive, process, and send information to and from one or more remote devices, such as media control devices 14 and 16, as well as vehicle 12. In one embodiment, these servers can be operated by third party media content providers that provide media control devices with media content for presentation to one or more users. Such media content can be audiovisual content, including movies, television shows, music videos, etc., as well as videogames and AR/VR media experiences. As used herein, AR/VR (augmented reality/virtual reality) includes virtual reality (VR) including computer-generated VR (CG VR), augmented reality (AR), mixed reality (MR), and other types of immersive augmented or virtual media content. Audio content can also be provided as well, including music, podcasts, etc. Databases 94 can hold media content as well as credentials and/or other authorization/authentication information. AR/VR immersive media content, which is media content that includes information regarding certain vehicle functionality to be carried out during presentation of the media content, can be sent to the vehicle and/or the media control devices 14,16.

Smartphone 14 is a media control device that is capable of providing media content to one or more interfaces (either included in smartphone 14 or included at another device connected to smartphone 14). As used herein, "media control device" refers to those devices that are capable of obtaining and presenting media content. And, as used herein, "AR/VR media control devices" are those media control devices that are configured to obtain and present AR/VR media content and that include suitable hardware and processing capabilities for presenting AR/VR media content. Non-limiting examples of media control devices are a smartphone, personal computer (PC), laptop, tablet, smart television, AR/VR goggles or displays, and/or a dongle (e.g., such as those that may be connected to a television including Chromecast™ and Firestick™). In some embodiments, the smartphone (media control device) 14 may include: hardware, software, and/or firmware enabling cellular telecommunications and short-range wireless communications (SRWC) as well as other mobile device applications. As used herein, a personal media control device is a media control device that is portable by a user and where the portability of the device is at least partly dependent on the user, such as a wearable device (e.g., a smartwatch, AR/VR goggles), an implantable device, or a handheld device (e.g., a smartphone, a tablet, a laptop). As used herein, a short-range wireless communications (SRWC) device is a device capable of SRWC and that includes the requisite SRWC circuitry to perform such SRWC.

In many embodiments, the hardware of the media control devices, including smartphone 14, may comprise a processor and memory (e.g., non-transitory computer readable medium configured to operate with the processor) for storing the software, firmware, etc. In one embodiment, the media control devices can include a SRWC circuit, such as the one discussed below with respect to wireless communications device 30 of vehicle 12. The media control device's processor and memory may enable various software applications, which may be preinstalled or installed by the user (or manufacturer) (e.g., having a software application or graphical user interface (GUI)). One implementation of a media control device application may enable the media control device (e.g., smartphone 14) to receive media content via land network 76 and/or cellular carrier system 70 and to play or otherwise present the media content to a user via one or more user-device interfaces at the media control device. In one embodiment, media control device 14 may include a display that can be used to visually present media content to a user and may include an audio system that can be used to audibly present media content to a user. Other playback components or devices can be included and/or controlled by the media control device 14, such as a tactile or haptic device.

In some embodiments, a visual display head mount can be used in conjunction with media control device (e.g., smartphone 14) to mount the device in front of the user's field of vision, as well as enclosing the peripheral field of view of the user. The visual display head mount can be a separately sold and manufactured device that includes a slot or that is otherwise configured for holding media control devices in an orientation such that, when the device is placed within the slot (or otherwise attached to the visual display head mount) and worn properly by the user, the display of the media control device is within the user's field of vision. Such a visual display head mount that is used in conjunction with a suitable media control device can be used to transform an ordinary media control device (e.g., smartphone) into a pair of AR/VR goggles. As those skilled in the art will appreciate, even though AR/VR headsets may be referred to as a pair of goggles, only a single display is required, rather than a pair of displays as the name would ostensibly imply.

The pair of Augmented Reality/Virtual Reality (AR/VR) goggles 16 is an AR/VR media control device that can be used to obtain, process, and present audiovisual content to a user. The pair of AR/VR goggles 16 is a head-mounted display that includes a processor and memory, as well as computer instructions (e.g., software, firmware) that enables AR/VR media content to be displayed. And, in some embodiments, the AR/VR goggles 16 can be an AR/VR headset that is manufactured to include AR/VR goggles integrated with a head mount and that includes an audio speaker. The AR/VR goggles 16 can also include other components, such as a SRWC circuit (similar to SRWC circuit 32 discussed below), an accelerometer (or orientation sensors), one or more cameras or other lens capable of receiving and digitizing light signals, a battery, speakers or headphones for presenting audio content, and various other hardware or software components. The AR/VR goggles can be configured for use with applications developed according to a software development kit (SDK) that is configured specifically for AR/VR devices, or that can support AR/VR functionality.

Additionally, as mentioned above, the AR/VR goggles can include speakers or headphones that can present audio content to the user via soundwaves. Such audio content may be a part of audiovisual media content, and the audio and video output of the AR/VR goggles can be synced. In other embodiments, the AR/VR goggles may only include a video output and may connect with other user-device interfaces, such as those included in the vehicle, to output the audio content. And, as will be discussed in more detail below, the AR/VR goggles can send immersive media control requests to the vehicle in an attempt to achieve desired vehicle functionality using one or more VSMs thereby providing a more immersive experience for the user. These immersive media control requests can be bundled into a single request that is sent by the AR/VR goggles initially (e.g., at the beginning of an immersive media content experience), or may be sent at times corresponding to when the requested vehicle functionality is desired.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) module 22, body control unit (BCM) 24, other vehicle system modules (VSMs) 26, a wireless communications device 30, seat heaters 40, seat air conditioning devices 42, heating/ventilation/air conditioning system 46, interior lights 48, vehicle-user interfaces 50-58, seat motors 60, and haptic motors 62. Some or all of the different vehicle electronics may be connected for communication with each other via one or more communication busses, such as bus 28. Communications bus 28 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS module 22, BCM 24, wireless communications device 30, temperature control modules 40-46, interior lights 48, seat motors 60, haptic motors 62, and vehicle-user interfaces 52-58, as will be described in detail below. The vehicle 12 can also include other VSMs 26 in the form of electronic hardware components that are located throughout the vehicle and, which may receive input from one or more sensors and use the sensed input to perform diagnostic, monitoring, control, reporting, and/or other functions. Each of the VSMs 26 is preferably connected by communications bus 28 to the other VSMs, as well as to the wireless communications device 30, and can be programmed to run vehicle system and subsystem diagnostic tests. One or more VSMs 26 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Wireless communications device 30 is capable of communicating data via short-range wireless communications (SRWC) and/or via cellular network communications through use of a cellular chipset 34, as depicted in the illustrated embodiment. In the illustrated embodiment, wireless communications device 30 includes an SRWC circuit 32, a cellular chipset 34, a processor 36, memory 38, and antennas 40 and 50. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™ WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device.

Additionally, in some embodiments, the wireless communications device may contain a cellular chipset 34 thereby allowing the device to communicate via one or more cellular protocols, such as those used by cellular carrier system 70. In other embodiments, the cellular chipset 34 may be incorporated into another VSM, such as a separate telematics unit.

Wireless communications device 30 may enable vehicle 12 to be in communication with one or more remote networks (e.g., one or more networks at remote facilities 80,90 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may include RAM, other temporary powered memory, any non-transitory computer-readable medium (e.g., EEPROM), or any other electronic computer medium that stores some or all of the software needed to carry out the various external device functions discussed herein. Similar components to those previously described (processor 36 and/or memory 38, as well as SRWC circuit 32 and cellular chipset 34) can be included in media control devices 14 and/or 16.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by a body control module or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

The vehicle may use the wireless communications device 30 to detect other SRWC devices, such as media control devices 14,16. A connection between the wireless communications device 30 and one or more devices 14,16 may allow for the operation of various vehicle-device functionality. Vehicle-device functionality (or function) refers to any function of the vehicle that may be complimented, improved, supported, or carried out through a media control device; any function of the media control device that may be complimented, improved, supported, or carried out through the vehicle; or any other function that may be carried out using the vehicle and one or more media control devices. For example, vehicle-device functionality can include using the media control device 14 to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the media control device with hands-free calling, such as through use of vehicle-user interfaces to place, receive, and carry out voice calls; sending information to the media control device, such as geographical information to the media control device 14 (such as information obtained from the GPS module 22) or vehicle diagnostic information or codes; and carrying out commands (e.g., commands to perform certain vehicle functions) received at the vehicle from the personal content playback device.

The wireless communications device 30 may be configured to listen for one or more wireless signals, such as those that may be sent by media control device 14. In one embodiment, wireless communications device 30 may receive a connection request message from media control device 14 or 16. Thereafter, the wireless communications device 30 can establish a SRWC connection with the requesting device via a four-way handshake and/or other connection establishment processes, such as those that establish a shared secret or one or more digital keys or other credentials used for securing the SRWC connection.

In one embodiment, wireless communications device 30 may be set to a discovery mode when the vehicle is switched to a powered on state. As used herein, a discovery mode is an operating mode for a SRWC device in which the SRWC device sends out wireless messages that typically are intended to discover or detect other SRWC devices using a SRWC protocol or technology. The discovery mode may include periodically or intermittently sending out messages or advertisements in an attempt to elicit a response from other SRWC devices in range. In one embodiment, the wireless communications device 30 may transmit a Bluetooth™ Low Energy advertising package (e.g., an advertisement), such as an ADV_IND (an undirected advertisement) message, an ADV_DIRECT_IND (a directed advertisement) message, or an ADV_SCAN_IND (scanable undirected advertisement). For example, the wireless communications device 30 may transmit an ADV_IND message according to a predefined or predetermined time interval (e.g., 30 milliseconds (ms)). Or, the device 30 may vary the time interval by randomizing the interval (e.g., randomly or pseudo-randomly selecting a time between 10 ms and 40 ms for each advertisement). In other embodiments, a wired communication connection can be established between media control devices 14,16 and the vehicle, such as through using Universal Serial Bus (USB) cables and drivers included on the respective devices.

Global navigation satellite system (GNSS) module 22 receives radio signals from a constellation of GNSS satellites. In one embodiment, the GNSS module 22 may be a global positioning system (GPS) module, which may receive GPS signals from a constellation of GPS satellites 96. GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 28 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display and can be used to provide a multitude of input and output functions. Display 58 can be a touch screen on the instrument panel, a heads-up display reflected off of the windshield, or a projector that can project graphics for viewing by a vehicle occupant. Any one or more of these vehicle-user interfaces that can receive input from a user can be used to receive a driver override request, which is a request to cease operating the one or more VSMs as a part of the immersive media experience. Various other vehicle user interfaces can also be utilized, as the interfaces of FIG. 1 are only an example of one particular implementation.

Body control module (BCM) 24 is shown in the exemplary embodiment of FIG. 1 as being electrically coupled to communication bus 28. In some embodiments, the BCM 24 may be integrated with or part of a center stack module (CSM) and/or integrated with wireless communications device 30. Or, the BCM may be a separate device that is connected to one another via bus 28. BCM 24 can include a processor and/or memory, which can be similar to processor 36 and memory 38 of wireless communications device 30, as discussed below. BCM 24 may communicate with wireless device 30 and/or one or more vehicle system modules, such as an engine control unit (ECU) (not shown), audio system 54, or other VSMs 26. BCM 24 may include a processor and memory such that the BCM may direct one or more vehicle operations including, for example, controlling central locking, air conditioning, power mirrors, controlling the vehicle primary mover (e.g., engine, primary propulsion system), and/or controlling various other vehicle modules. For example, BCM 24 can send signals to seat heaters 40, seat AC devices 42, HVAC 46, interior lights 48, seat motors 60, and/or haptic motors 62. BCM 24 may receive data from the wireless communications device 30 and, subsequently, send the data to one or more vehicle modules.

Additionally, BCM 24 may provide vehicle state information corresponding to the vehicle state or of certain vehicle components or systems. For example, the BCM may provide the device 30 with information indicating whether the vehicle's ignition is turned on, the gear the vehicle is presently in (i.e. gear state), and/or other information regarding the vehicle. The BCM 24 can obtain information from one or more other vehicle modules to obtain this information.

Vehicle electronics 20 also includes numerous other VSMs 40-48,60-62 that can be automatically controlled by the vehicle and that can be used to provide tactile, haptic, or other perceptions to a user in conjunction with the audio-visual (AV) or visual content presentation provided by the AR/VR goggles (or other media control device). Temperature control modules 40-46 include VSMs that are included as a part of the vehicle electronics 20 and that can be used to control the temperature inside the vehicle. Seat heaters 40 and/or seat air conditioning (AC) device 42 can be coupled to a backrest and/or bed of the seat. These devices can provide heating and/or air conditioning to these regions of the seat. Additionally, the vehicle can include a HVAC (heating/ventilation/AC) (or climate control) system that can be used to control the ambient air temperature inside the cabin of the vehicle. Such a system can include an air conditioning (AC) unit or device that cools the interior air of the vehicle, a vehicle heating system that heats the interior air of the vehicle, and a ventilation system including blower fans that can provide ventilation as well as conduits for the cooled and/or heated air.

Additionally, vehicle electronics 20 can include interior lights 48 that can be used to provide lighting to one or more areas within the vehicle cabin. Interior lights 48 can be light emitting diodes that are controllable by another VSM, such as an infotainment unit included in the vehicle, and may be operable to transmit light of varying colors and intensities, as well as at different times. Power seat motors 60 can be automatically controlled by one or more vehicle systems (such as BCM 24) and can be used to adjust the position, height, inclination of the seatback, and/or other seat position or orientation properties. Power seat motors 60 can also be controlled through use of one or more manual switches included within the vehicle cabin. Haptic motors (or vibration motors) 62 are devices that communicate with a user via haptic or kinesthetic communication (e.g., vibrations or other motions tactilely perceivable to a user). The haptic motors 62 can receive discrete signals (e.g., ON or OFF) or may receive a signals that include or convey a particular output level that can dictate the amount of vibration or tactile feedback to convey using the haptic motors. Haptic motors 62 can be comprised of various types of motors, including eccentric rotating mass vibration motors (ERMs) or linear resonant actuators (LRAs). Various other types of VSMs can be included in system 10 and used below with the method 200 (FIG. 2).

Figure 2:
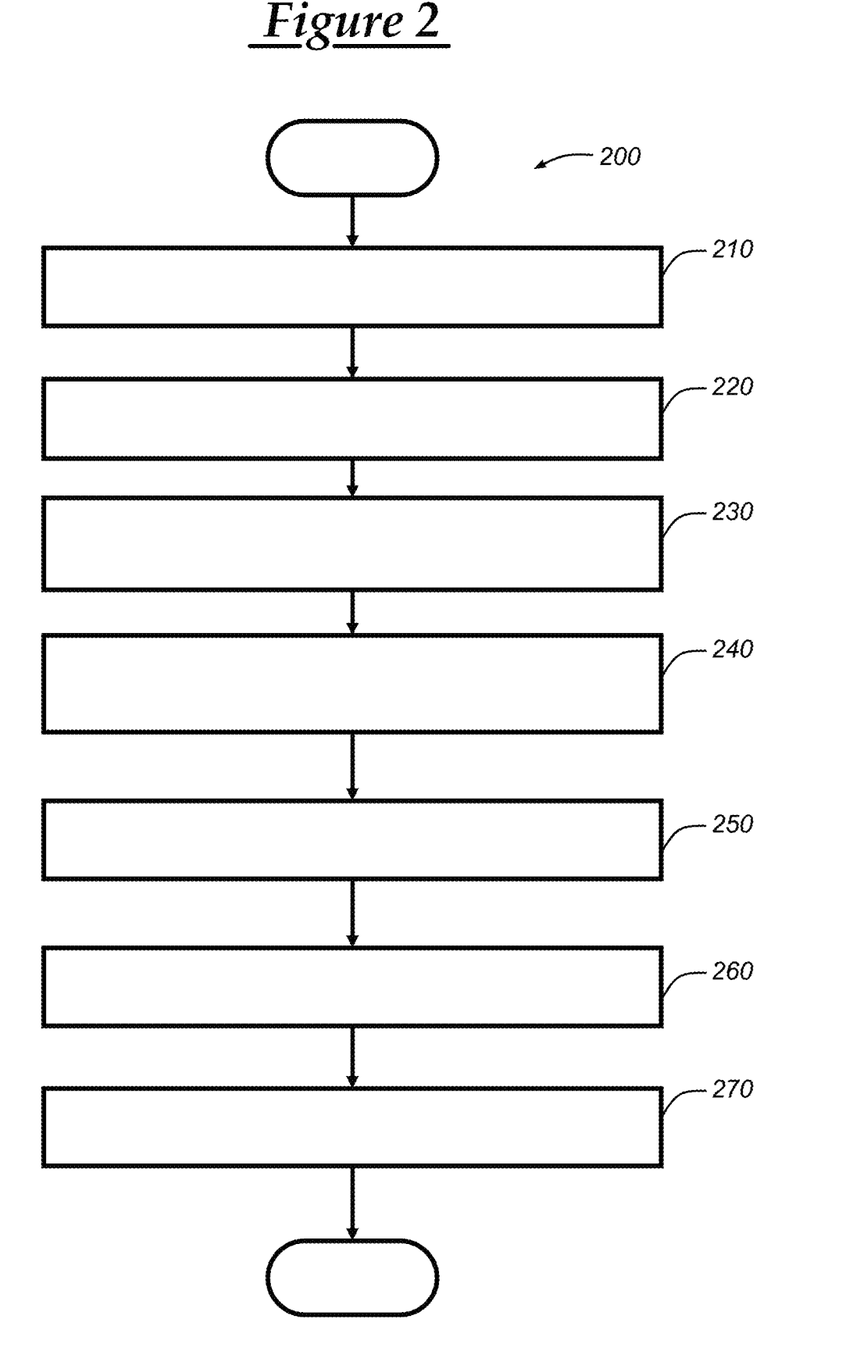
FIG. 2 is a flowchart of an embodiment of a method of providing an immersive media experience to a user through utilizing one or more vehicle system modules (VSMs) included in a vehicle.

With reference to FIG. 2, there is shown a method 200 of providing an immersive media experience to a user through utilizing vehicle system modules included in a vehicle. Method 200 can be carried out by vehicle electronics 20 and, in some embodiments, can be carried out by wireless communications device 30. Generally, method 200 can include the step of establishing a connection with a media control device, receiving an immersive media control request from the media control device, determining whether the media control device is authorized to control the one or more VSMs, receiving VSM control requests from the media control device, and controlling the one or more VSMs according to the received VSM control requests. However, various other embodiments exist, as will be apparent from the discussion below in light of the discussion of system 10 provided above.

In one embodiment, the method 200 or parts thereof can be implemented in a computer program (or "application") embodied in a computer readable medium and including instructions usable by one or more processors of one or more computers of one or more systems. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media (such as memory 38 and/or memory in BCM 24), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Method 200 begins with step 210, wherein a connection with a media control device is established. The connection can be established via a wired connection or via use of SRWC. In the case of establishing a connection using a wired connection, a user can plug a cord or cable, such as a USB cable, into a corresponding port included within the vehicle and within the media control device. In other embodiments, where a SRWC connection is established, the vehicle can send out a beacon or advertisement using SRWC circuit 32. The advertisement can include data indicating that the vehicle desires to or can connect with a media control device, or that the vehicle can offer immersive media experience services, such as those that utilize one or more VSMs. This message can then be received by the media control device, which can then generate a response thereto, such as a message that initiates a four-way handshake or other authentication and/or shared key/secret establishment process. In other embodiments, the media access control device can transmit an advertisement or beacon message indicating to those SRWC devices within range that the media control device is searching for devices that can provide immersive media experience services. After the connection is established, the method 200 proceeds to step 220.

In step 220, immersive media experience information is received from the media control device. The immersive media experience information can include various information, such as permission requests indicating certain VSMs that the media control device seeks to control or send requests to, as discussed more below. The immersive media experience information can also include credentials of a user, other user identifying information including the user's or media control device's position within the vehicle interior, and/or various other information, such as certain user configurations concerning the immersive media experience. The immersive media experience information can be sent to the vehicle in a single message, or may be split into various messages. And, additionally, the information can be sent at different times, such as sending permission requests after sending authorization information (e.g., credentials) and/or after receiving a response from the vehicle confirming the authorization, as discussed below.

Media content information can include a source of media content, title of media content, playback position of media content, volume of media content, closed captioning settings of media playback, language settings for media playback, and various other preferences and/or attributes of the media content playback. In some embodiments, the media content information can be received directly from the media control device via the established SRWC connection. Or, in other embodiments, the media content information can be received from the third party content provider facility 90 or vehicle backend services facility 80. The method 200 continues to step 230.

In step 230, it is determined whether the media control device is authorized to engage with the vehicle in presenting an immersive media experience. In one embodiment, the media control device can first send credentials, such as a username/password pair, to the vehicle and, after authorizing the credentials, the media control device can send other information, such as a set of permissions (step 240), user identifying information, and/or other configuration information. The credentials can be authorized by comparing the received credentials with stored credential information that is stored at the vehicle or obtained from a vehicle backend services facility 80 (or other remote server).

As mentioned above, the credentials sent from the media control device can include a username/password pair, but other types of credentials can be used, such as a token or entitlement string, which can include a unique string of bits or characters assigned to the media control device after authorization with a proper authority, such as one that may be located at vehicle backend services facility 80. After receiving the credentials from the media control device, the vehicle can verify the authenticity and/or authorize the user and/or media control device, which can include securely sending the credentials to vehicle backend services facility 80 and/or obtaining information from vehicle backend services facility 80 to verify the credentials. At the backend facility, the credentials can be compared with stored credential information, which can be included in databases 84. The method 200 continues to step 240.

In step 240, it is determined what permissions the media access control device is authorized for. In many embodiments, the immersive media experience information that was received in step 220 can include a set of a requested permissions. The requested permissions can specify one or more VSMs, as well as one or more operations or vehicle functions to be performed by those VSMs, which the media control device seeks to utilize during the immersive media content experience. Alternatively, the requested permissions may specify a class of permissions using a permissions class identifier (or other information) that can be used by the vehicle to determine the extent to which the media control device would like to control one or more VSMs. For example, the permission request can be a general request to control interior vehicle temperature instead of a request that specifies each temperature control module within the vehicle. Moreover, the immersive VSM control API can designate certain permission classes that can be used to specify certain types of desired control by the media control device. In at least one embodiment, the classes can designate a set of related vehicle functionality, including temperature or climate control of the vehicle interior or cabin (e.g., permission to control temperature control modules 40-46), audiovisual (AV) effects (e.g., permission to control audio system 54 and display 58), tactile effects, etc.

In one embodiment, the immersive media experience information can include media content identifying information, which is information that can be used to identify particular media content that may be presented as part of the immersive media content experience. The vehicle can then retrieve certain permission request information that is associated with the particular media content from a remote server, such as those located at remote facilities 80 or 90. Once the vehicle obtains these permissions, the vehicle can make a determination as to whether the vehicle will allow the media control device to control or access these VSMs during or as a part of the immersive media content experience, which can include obtaining authorized permission information for the media control device or user and comparing this information with the permission request information. The authorized permission information can be obtained from the vehicle backend facility 80 by, for example, sending user credentials or a user identifier (e.g., username) to the vehicle backend services facility 80, querying a database (e.g., database 84) for the authorized permission information using the user credentials or identifier, and then sending this information back to the vehicle. In other embodiments, the remote server can make this determination by recalling the permission request information for the media content (as specified by the media content identifying information), obtaining authorized permission information for the media control device or user, and verifying that the media control device or user has the proper authority to control certain VSMs based on comparing the permission request information with the authorized permission information.

In some embodiments, the permission request information (e.g., information containing permissions) and/or the authorized permission information can be supplemented or modified by permissions or configurations set at the vehicle. For example, a driver, operator, or other passenger of the vehicle may set immersive media experience preferences that indicate one or more VSMs or classes of VSMs that they desire to not be controlled and/or utilized as part of the immersive media experience. For example, the driver may want to feel comfortable when driving and, thus, may disable or deny permission for controlling temperature control modules 40-46. Or, the driver may set bounds or parameters for the VSMs or class of VSMs, such as a maximum or minimum tolerable temperature level of the vehicle interior.

Additionally, as mentioned above, the immersive media experience information can include information identifying certain properties or attributes of the user or media control device, including the location of the media control device or user within the vehicle. The location of the media control device or user can be useful for carrying out the immersive media experience since, when this information is known, the vehicle can direct sensory outputs of the various VSMs to that location within the vehicle. For example, when the vehicle determines that the user of the media control device is located in the front-right passenger seat of the vehicle, the vehicle can actuate seat heater 40 of the front-right passenger seat (e.g., during a hot desert scene of the media content), while not actuating the seat heater 40 of the driver seat. And, additionally, the vehicle can try to offset or mitigate the impact of the VSMs utilized during the immersive media experience so that other passengers or operators (e.g., drivers) not participating in the immersive media experience can avoid unwanted sensory perceptions due to the utilized VSMs. For example, when the media content is presenting a hot desert scene, the vehicle may have a raised interior cabin temperature (e.g., through use of HVAC 46) and, thus, this raised interior cabin temperature can be offset for other non-participating passengers or operators by actuating seat AC devices 42 located in all or some of the seats occupied by non-participating persons. The method 200 continues to step 250.

In step 250, a notification can be presented to passengers and/or operators of the vehicle, wherein the notification indicates that the immersive media experience is about to begin. This notification can act to inform or warn those in the vehicle that certain VSMs or vehicle controls may be automatically operated as a part of the immersive media experience. In one embodiment, the notification can list the particular VSMs or classes of VSMs that are to be controlled during the immersive media experience. And, after the notification is presented, which can be done using audio system 54 and/or display 58, the vehicle can prompt the driver or other passengers for verification before proceeding to begin the immersive media content experience. Once this verification is received, the immersive media experience can begin.

At the beginning of the immersive media experience, the media control device, which can include AR/VR goggles 16 or smartphone 14, can begin presenting audiovisual content through its display and/or speakers or headphones. In one embodiment, the immersive media experience can be computer generated virtual reality (CG VR) media content that uses computer generated graphics, such as a VR video game. In such an embodiment, the user may also have hand control devices that are intended and/or configured to be held and controlled using the user's hands and fingers. These control devices can be used to interact with the environment presented in the immersive media experience, as well as for controlling playback and/or modifying settings. In other embodiments, the immersive media experience can be passive (i.e., no or limited user interaction), such as a real-life virtual reality experience. And, in other embodiments, the immersive media experience can include augmented reality, including presenting graphics over the user's field of vision. The method 200 continues to step 260.

In step 260, immersive media control requests are received at the vehicle. These requests can be received via the established SRWC connection at the wireless communication device 30. The immersive media control requests can be requests to use particular VSMs and can include parameter(s) or options for use in carrying out the requested vehicle functions. For example, when the media content presented at the media control device includes a blizzard, the immersive media control request can include a request to lower the interior cabin temperature, as well as actuate the seat AC device. Moreover, a particular temperature can be specified within the request, as well as a blower speed (e.g., a high or maximum blower speed) so as to enable the user to virtually experience the blizzard, which can include cold temperatures and fast winds. Moreover, as mentioned above, the position of the user can be taken into consideration when carrying out the requested vehicle functions.

In some embodiments, once the a request is received, the vehicle can verify that the request is authorized to be carried out through, for example comparing the VSMs or classes of VSMs, as well as any specified parameters, with the authorized permission information obtained in step 240. When it is determined that the requested vehicle function is not permitted, the vehicle can ignore or not carry out the requested vehicle function.

In other embodiments, immersive media control requests can be obtained all at once, such as before or at the beginning of the immersive media experience. The requests can be associated with a timestamp corresponding to a time during the immersive media experience when the corresponding vehicle function should be performed. For example, during the immersive media experience, the media control device can continuously or periodically inform the vehicle of the current time position that the immersive media experience is presently at. Then, upon the current time position reaching the timestamp (or other time indicator), the associated or corresponding requested vehicle function can be carried out. In other embodiments, other indicators can be used instead of a timestamp, such as a request identifier. Thus, at the appropriate time, the media control device can send the request identifier to the vehicle and, then, the vehicle can perform the requested vehicle function, assuming the proper authorization is in place. When the vehicle obtains the immersive media control requests or information ahead of the time (i.e., before the requested vehicle function is to be carried out), the vehicle may prepare one or more VSMs for the requested vehicle function. The method 200 continues to step 270.

In step 270, the one or more VSMs are carried out according to the received VSM control requests such that the one or more VSMs are operated to perform their respective requested functionality. This can include sending control information included in or derived from the immersive media control requests to the VSMs via bus 28. In one embodiment, the control information can be generated or obtained at BCM 24, which can then forward this information (or other derived information) to the appropriate VSM(s) for performing the requested vehicle function. In this way, BCM 24 can act as an intermediary between the wireless communication device 30 and the VSM(s) to be utilized in the immersive media experience. Moreover, the BCM 24 can coordinate certain vehicle functionality so as to resolve inconsistencies or conflicting information that may be received from other vehicle controls—e.g., when an immersive media temperature control request is received requesting a temperature of 65° F. and the temperature switch on the vehicle center console is set to 75° F., the BCM can determine to override the setting of the temperature switch. The method 200 then ends.

In a particular embodiment, a driver may use AR/VR goggles to aid in operating the vehicle. These goggles can include a camera that faces in a direction in front of the user wearing the goggles and can use image or object recognition technology to detect certain events, such as an imminent vehicle collision. In such a case, the AR/VR goggles can relay this information (or send an immersive media control request) to the vehicle, which can then carry out one or more vehicle functions to notify the driver of the imminent collision or other event, such as through actuating a haptic sensor in the seat or playing an audio sound.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method of providing an immersive media experience to a user through utilizing one or more vehicle system modules (VSMs) included in a vehicle, wherein the method comprises:
    establishing a connection with a media control device, wherein the media control device includes a display;
    determining whether the media control device is authorized to control the one or more VSMs as a part of the immersive media experience;
    receiving an immersive media control request from the media control device, wherein the immersive media control request includes a request from the media control device to perform one or more vehicle functions using the one or more VSMs during playback of immersive media content that simulates an environment pertaining to the immersive media content, and wherein the playback of the immersive media content includes visually perceptible media content that is displayed using the display of the media control device;
    determining a position inside the vehicle in which the media control device is located; and
    controlling the one or more VSMs according to the received VSM control request, wherein the controlling of the one or more VSMs is based on the position inside the vehicle in which the media control device is located;
    wherein controlling comprises:
        providing a first temperature adjustment to simulate a temperature of the environment of the immersive media content for occupants of the vehicle that are experiencing the immersive media content; and
        providing a second temperature adjustment to counteract the first temperature adjustment for other occupants of the vehicle that are not experiencing the immersive media content.

2. The method of claim 1, wherein the media control device is a pair of wearable electronic augmented reality/virtual reality (AR/VR) goggles configured for visually presenting augmented reality or virtual reality media content to a user.

3. The method of claim 1, wherein the connection is established using short-range wireless communications (SRWC), wherein the SRWC include Bluetooth™ Wi-Fi™, or other IEEE 802.11 technology.

4. The method of claim 3, further comprising the step of receiving credentials from the media control device, wherein the credentials are received after establishing the connection, and wherein the determining step includes comparing the received credentials with stored credential information.

5. The method of claim 1, further comprising the steps of:
    obtaining permission request information, wherein the permission request information identifies at least one of the VSMs or a class of VSMs that the media control device requests to utilize during the immersive media experience; and
    determining whether to allow utilization of the one or more VSMs or VSMs included in the class of VSMs during the immersive media experience.

6. The method of claim 5, wherein the permission information is obtained as a part of the immersive media control request, and wherein the immersive media control request is received before beginning the immersive media experience.

7. The method of claim 1, wherein performance of the one or more vehicle functions includes using the one or more VSMs to communicate with the user by creating an environment that is perceivable by the user using non-audiovisual effects.

8. The method of claim 1, further comprising:
    determining whether a user of the media control device has permission for the request, based at least in part on:
        a first permission indicator obtained via a backend facility that is remote from the vehicle; and
        a second permission indicator that is obtained within the vehicle itself;
    wherein the controlling of the one or more VSMs is provided based upon a further condition that the user of the media control device has permission for the request that is based on both the first permission indicator and the second permission indicator.

9. The method of claim 8, wherein the second permission indicator supplements the first permission indicator.

10. The method of claim 8, wherein the second permission indicator modifies the first permission indicator.

11. The method of claim 1, wherein:
    the step of providing the first temperature adjustment comprises adjusting an air temperature of the vehicle to simulate the temperature of the environment of the immersive media content for occupants of the vehicle that are experiencing the immersive media content; and
    the step of providing the second temperature adjustment comprises adjusting a seat temperature for other occupants of the vehicle that are not experiencing the immersive media content.

12. The method of claim 11, wherein:
    the step of adjusting the air temperature comprises increasing the heating the air temperature of the vehicle to simulate the temperature of the environment of the immersive media content for occupants of the vehicle that are experiencing the immersive media content; and
    the step of adjusting the seat temperature comprises decreasing the seat temperature for other occupants of the vehicle that are not experiencing the immersive media content.

13. A method of providing an immersive media experience to a user through utilizing one or more vehicle system modules (VSMs) included in a vehicle, wherein the method comprises:
    establishing a connection with a media control device, wherein the media control device includes a display;
    receiving an immersive media control request from the media control device, wherein the immersive media control request includes a request from the media control device to perform one or more vehicle functions using the one or more VSMs during playback of immersive media content that simulates an environment pertaining to the immersive media content, and wherein the playback of the immersive media content includes visually perceptible media content that is displayed using the display of the media control device; and
    controlling the one or more VSMs according to the received VSM control request, wherein the controlling comprises:
        providing a first temperature adjustment to simulate a temperature of the environment of the immersive media content for occupants of the vehicle that are experiencing the immersive media content; and
        providing a second temperature adjustment to counteract the first temperature adjustment for other occupants of the vehicle that are not experiencing the immersive media content.

\* \* \* \* \*